US012012155B2

(12) United States Patent
Dix et al.

(10) Patent No.: US 12,012,155 B2
(45) Date of Patent: Jun. 18, 2024

(54) SYSTEM OF A SIDE SKIRT FOR A CAR OF A MULTI-CAR VEHICLE AND A SIDE SKIRT SUPPORT

(71) Applicant: Dellner Couplers AB, Falun (SE)

(72) Inventors: Norman Dix, Ingolstadt (DE); Philipp Krach, Ellingen (DE)

(73) Assignee: Dellner Couplers AB, Falun (SE)

( * ) Notice: Subject to any disclaimer, the term of this patent is extended or adjusted under 35 U.S.C. 154(b) by 415 days.

(21) Appl. No.: 17/357,974

(22) Filed: Jun. 24, 2021

(65) Prior Publication Data
US 2022/0048582 A1 Feb. 17, 2022

(30) Foreign Application Priority Data
Jun. 26, 2020 (EP) .................................... 20182543
Sep. 1, 2020 (EP) .................................... 20193886

(51) Int. Cl.
*B62D 35/00* (2006.01)
*B61G 7/12* (2006.01)
*B62D 35/02* (2006.01)

(52) U.S. Cl.
CPC .............. *B62D 35/02* (2013.01); *B61G 7/12* (2013.01); *B62D 35/001* (2013.01)

(58) Field of Classification Search
CPC .... B62D 35/00; B62D 35/001; B62D 35/002; B62D 35/02; B61G 7/12; Y02T 30/00; E05Y 2900/51; E05Y 2900/516; B61D 17/06
See application file for complete search history.

(56) References Cited

U.S. PATENT DOCUMENTS

| 5,609,384 | A | * | 3/1997 | Loewen | B62D 35/001 |
| | | | | | 296/180.1 |
| 6,932,419 | B1 | * | 8/2005 | McCullough | B62D 35/001 |
| | | | | | 296/180.1 |
| 8,757,066 | B2 | | 6/2014 | Heinisch et al. | |

(Continued)

FOREIGN PATENT DOCUMENTS

DE    4445182 C1    12/1995
EP    0826570 A2    3/1998

(Continued)

*Primary Examiner* — Gregory A Blankenship
(74) *Attorney, Agent, or Firm* — Howard IP Law Group, PC

(57) ABSTRACT

A system of a side skirt for a car of a multi-car vehicle and a side skirt support, the side skirt configured to cover a space below the underframe of the car from a side, and having a coupler side edge that forms a side of the side skirt and arranged next to a coupler head of the car, the side skirt support suitable to attach the side skirt to the underframe of the car, the side skirt support having a bar with a first joint suitable to be attached to the underframe to allow rotation relative to the underframe, the bar being attached to a part of the side skirt via a second joint that allows part of the side skirt to rotate relative to the bar, the side skirt support having a rotation controller that limits the rotation that the part of the side skirt attached to the bar can perform relative to the bar, whereby the part attached to the bar can rotate into an end position, but cannot rotate beyond that end position.

12 Claims, 7 Drawing Sheets

(56) References Cited

U.S. PATENT DOCUMENTS

| | | | | |
|---|---|---|---|---|
| 2009/0189414 A1* | 7/2009 | Boivin | B62D 35/001 | 296/180.1 |
| 2010/0264691 A1* | 10/2010 | Giromini | B60R 19/56 | 296/180.4 |
| 2011/0296762 A1* | 12/2011 | Ahrens | B61D 17/06 | 49/340 |
| 2012/0074728 A1* | 3/2012 | Senatro | B62D 35/001 | 296/180.4 |
| 2013/0127204 A1* | 5/2013 | Johnson | B62D 35/00 | 296/180.4 |
| 2013/0133547 A1* | 5/2013 | Heinisch | B61D 17/00 | 105/413 |
| 2014/0117712 A1* | 5/2014 | Butler | B62D 27/02 | 296/180.2 |
| 2017/0217506 A1* | 8/2017 | Bezner | B62D 35/02 | |
| 2018/0094473 A1* | 4/2018 | Liu | E05F 15/00 | |
| 2018/0244228 A1* | 8/2018 | Desjardins | B60R 19/565 | |
| 2019/0031251 A1* | 1/2019 | Butler | B62D 35/001 | |
| 2020/0039587 A1* | 2/2020 | Bradley | B62D 35/008 | |
| 2020/0240201 A1* | 7/2020 | Wang | E06B 3/325 | |
| 2022/0089230 A1* | 3/2022 | Senatro | B62D 35/001 | |
| 2022/0266925 A1* | 8/2022 | Andersen | B62D 35/001 | |
| 2024/0002000 A1* | 1/2024 | Bradley | B62D 35/001 | |

FOREIGN PATENT DOCUMENTS

| | | |
|---|---|---|
| EP | 2208655 A1 | 7/2010 |
| FR | 2934550 A1 | 2/2010 |
| WO | 2007/073273 A1 | 6/2007 |
| WO | 2011/154527 A1 | 12/2011 |

* cited by examiner

SYSTEM OF A SIDE SKIRT FOR A CAR OF A MULTI-CAR VEHICLE AND A SIDE SKIRT SUPPORT

FIELD OF THE INVENTION

The invention relates to a system of a side skirt for a car of a multi-car vehicle and a side skirt support. The invention also relates to a car of a multi-car vehicle. The invention also relates to a method to move a side skirt from a car.

BACKGROUND

From day to day life multi-car vehicles, especially trains are known, whereby the individual cars of the multi-car vehicle are coupled to each other. For some of these multi-car vehicles there is a desire and/or a need to cover the space below the underframe of the car as much as possible. For example if such a multi-car vehicle is a tram that is used inside a city and which runs on rails that cross public spaces there is a desire to prevent humans and animals or other movable elements to be caught under the underframe of the car. Hence the multi-car vehicles in such situations are designed with skirts that cover the space below the underframe of the car from the side or rear or back.

For cars of a multi-car vehicle, which cars have been designed with side skirts and which cars have a coupler that is suitable to couple the car to a neighbouring car of the multi-car vehicle it is typical, that such couplers have a neutral position, but that these couplers can swivel out of the neutral position to the side. As the multi-car vehicle travels around a bend, the coupler typically swivels out of the neutral position. In such a design of cars there are two conflicting design criteria. On the one hand, one will attempt to give the coupler as much freedom to swivel out of the neutral position in order to allow the multi-car vehicle to go around bends. The more the coupler can swivel out of the neutral position, the smaller the radius of the band can be, around which the multi-car vehicles can travel. This design criterion is best fulfilled, if the room below the underframe of the car is left open as much as possible to the sides, to the front and to the back. On the other hand the above described design criterion exists which can be best achieved, if the space below the underframe of the car is covered as much as possible from the side, the front and the back, for example by skirts.

SUMMARY

To strike a balance between the two design criterion, a system of a side skirt for a car of a multicar vehicle and a side skirt support has been suggested, whereby the side skirt is suitable to cover a space below the underframe of the car from a side, whereby the side skirt has a coupler side edge that forms a side of the side skirt, the coupler side edge being suitable to be arranged next to a coupler head of the car. In such a system, the side skirt has a side skirt support suitable to attach the side skirt to the underframe of the car. In such a system, the side skirt support has a bar that has a first joint, the joint being suitable to be attached to the underframe to allow the bar to rotate relative to the underframe, whereby the bar is attached to a part of the side skirt by way of a second joint that allows the part of the side skirt to rotate relative to the bar. Such a system can be connected to a car of a multicar vehicle, the car having an underframe and a coupler that is suitable to couple the car to a neighbouring car of the multicar vehicle, the coupler being attached to the underframe, whereby the coupler has a coupler head and a coupler rod attached to the coupler head, the coupler rod being attached to the underframe by way of a coupler rod joint that allows the rod to swivel relative to the underframe, whereby the rod has a neutral position and can swivel towards one side of the neutral position and can swivel to the opposite side of the neutral position. If in such a design of a car the coupler head is moved to swivel around the coupler rod joint, the coupler head can be made to abut against the coupler side edge of the side skirt. Given that the side skirt support is designed in such a way that the bar can rotate relative to the underframe around the first joint, further movement of the coupler head into the direction of the side skirt after the coupler head has abutted against the side skirt leads to the side skirt being swiveled towards the side.

Given this background there is the problem to be solved to better control the path that the side skirt travels along as it is pushed by out of the way of the coupler head.

This problem is solved by the system of a side skirt and a side skirt support. This problem is also solved by a car of a multicar vehicle. This problem is also solved by a method to move a side skirt. Preferred embodiments are described in the subordinate claims and the description hereafter.

The basic concept of the invention is to have the side skirt also have a rear side and to define a reference line to be a line that connects a point on the coupler side edge with a point on the rear side, whereby the side skirt and the side skirt support have a normal position, in which the bar is arranged to point into a first direction, and whereby the side skirt and the side skirt support have a displaced position, in which the bar is arranged to point into a second direction, and whereby the reference line is pointing into a normal position direction, when the side skirt and the side skirt support are in the normal position, and the reference line is pointing into a displaced position direction, when the side skirt and the side skirt support are in the displaced position. According to the basic concept of the invention, a rotation controller is provided, that limits the amount of rotation that the side skirt performs between the normal position and the displaced position, such that the normal position direction is equal to or parallel to the displaced position direction
  1. or
the angle between the normal position direction and the displaced position direction is smaller than 30°.

In a preferred embodiment, the side skirt support has a rotation controller that limits the rotation that the part of the side skirt that is attached to the bar, can perform relative to the bar, such that the part that is attached to the bar can rotate into an end position, but cannot rotate beyond that end position. The invention has recognized that a risk exists that a side skirt that is being pushed out of the way of the coupler head over rotates around the bar of the side skirt support. This could lead to parts of the side skirt traveling into a position, where they stick out further from the car than certain relevant parts of the coupler head, for example the coupler plate do. Such an arrangement of a part of the side skirt provides the risk that this part of the side skirt collides with parts of the side skirt or other parts of the neighbouring car, to which the respective car is connected. By way of limiting the amount of rotation that the part of the side skirt, that is attached to the bar, can perform relative to the bar, such that the part that is attached to the bar can rotate into an end position, but cannot rotate beyond that end position, it can be prevented that parts of the side skirt stick out further beyond relevant parts of the coupler head, for example beyond the coupler plate.

The invention pertains to a system of a side skirt and a side skirt support. The side skirt is suitable to cover a space below the underframe of the car from a side. The side skirt will typically be made from a lightweight metal, for example aluminium or will even more preferred be made from other lightweight material, for example a carbon fiber composite like carbon fiber or graphite reinforced polymers. The shape of the side skirt will typically be dominated by aerodynamic or aesthetic aspects. The side skirt will generally be extending downwards. Designs are feasible, where the side skirt has a horizontal top edge and extends generally downwards from the horizontal top edge. It is to be expected, however, that even the top edge of the side skirt in its design is dominated by design considerations or by considerations, where a sectional line between other parts of the car, for example side walls of the car can be best placed. The side skirt also can have a bend. The side skirt can, for example, have a part that is provided to cover the space below the underframe of the car from the side, while at the same time the side skirt has a part that is provided to cover a space below the underframe of the car from the front of the car (or the back, the terms "front" and "back" in a car of a multi-car vehicle often only being defined by the viewing direction). The side skirt can hence extend around a front corner of the car (or a back corner of the car). The side skirt that generally extends downward can have steps or curvatures towards the front or towards the side. For example the side skirt can have a lower section that looks like a bumper and that is arranged further outward and further forward (or backward on the back end of the car) than other parts of the side skirt.

In a preferred embodiment the side skirt has a back piece and has a cover. The cover of the side skirt can be the part that is made from a lightweight material, like for example aluminium or a carbon fiber composite like carbon fiber or graphite reinforced polymers. This cover can be the piece that is used to fulfill the optical design criterions which are requested by the designers. The back piece can be a support piece or a frame to which the cover is attached. Designing the side skirt as a two-part element with a back piece and a cover allows the cover to be more easily exchanged, if it is damaged, for example during a crash.

In a preferred embodiment the side skirt (if the side skirt itself is a one-piece element) or the cover of the side skirt (for those embodiments, where the side skirt comprises a back piece and a cover) is designed as a one-piece element. Hence any translatory or rotational movement that is made by a part of the side skirt/a part of the cover translates into appropriate translatory or rotational movements of other parts of the side skirt/the cover. Designs are feasible, where the side skirt/the cover are made of two panels that are joined by a hinge, whereby the two panels can be folded together. It is preferred, however, if the side skirt/the cover is made as one piece, however.

The side skirt has a coupler side edge that forms a side of the side skirt, the coupler side edge being suitable to be arranged next to a coupler head of the car. The coupler side edge can extend along a line. The coupler side edge can extend along a line, which line extends generally downwards, but also can be made to extend at a small angle to the vertical, especially an angle of less then 60°, preferably an angle of less than 45° to the vertical. Such coupler side edges can be used, where the side skirt is designed to not extend straight downwards, but to only generally extend downwards, but within the downward extent also progresses further sideways or further towards the front. Designs are feasible, where the coupler side edge is the complete side of a side skirt from a top corner of the side skirt to a bottom corner of the side skirt. Designs are also feasible, however, where the side skirt is designed to encirculate the coupler head or the coupler rod, for example where the side of the side skirt that is arranged next to the coupler generally has a U-shaped design and has a part of the side that is intended to be placed above the coupler head and has a side portion that is provided to be arranged below the coupler head. In such a design, the coupler side edge would be that part of the side of the side skirt that is arranged next to the coupler head on the same height as the coupler head.

The side skirt has a rear side. Preferably the rear side is the opposite side of the side skirt compared to the coupler side edge.

A reference line is defined to be a line that connects a point on the coupler side edge with a point on the rear side. The reference line is used to describe the orientation of the side skirt in space and the possible change of orientation of the side skirt between the normal position and the displaced position. Hence, it does not need to be defined precisely from which point on the coupler side edge to which point of the rear side the reference line is drawn, as long as when comparing the orientation of the side skirt in the different positions, the reference line is always taken to be drawn from the same point on the coupler side edge to the same point on the rear side. In a preferred embodiment, the coupler side edge terminates in a lower corner and the rear side terminates in a lower corner and the reference line is defined to be the line between the lower corner of the coupler side edge and the lower corner of the read side. If the side skirt is made with two piece, especially two panels or two cover-parts, whereby the two pieces of the side skirt can move relative to each other, the reference line is defined to be a line that connects a point on the coupler side edge with a point on the rear side of the piece on which the coupler side edge is provided.

The side skirt support is suitable to attach the side skirt to the underframe of the car. The side skirt support has a bar that has a first joint, the joint being suitable to be attached to the underframe to allow the bar to rotate relative to the underframe, whereby the bar is attached to a part of the side skirt by way of a second joint that allows the part of the side skirt to rotate relative to the bar.

The invention is purposefully directed to a system of a side skirt and a side skirt support, because such a system is a tradable object in the market. Typically, a car manufacturer of a multi-car vehicle will buy the system that comprises a side skirt and a side skirt support from a supplier. The manufacture of the car will typically define the place at the underframe of the car, where the side skirt support is to be attached to the underframe of the car. It is even feasible that in existing cars that already have a system of a side skirt and a side skirt support, the existing system of a side skirt and a side skirt support is replaced by the system according to the invention without any other change to the existing car hence providing an upgrade of the existing car to the system according to the invention.

The first joint and the second joint can be simple joints, for example can be a pin that is inserted into a hole in the bar. If the system according to the invention is designed for a car that will be used on a track that has many bends, it is to be expected, however, that the side skirt will be made to rotate relative to the bar frequently and the bar will rotate relative to the underframe frequently. Hence in these scenarios, the first joint and the second joint can comprise ball bearings or other features that reduce wear and that allow the rotational movements to be repeated frequently.

The side skirt and the side skirt support have a normal position, in which the bar is arranged to point into a first direction, whereby the side skirt and the side skirt support have a displaced position, in which the bar is arranged to point into a second direction. In a preferred embodiment, the normal position is that position, in which the bar of the side skirt support is rotated furthest about the first joint in one direction and the displaced position can be an end position, in which the bar of the side skirt support is rotated furthest about the first joint in the direction opposite to the one direction.

According to the basic concept of the invention, a rotation controller is provided, that limits the amount of rotation that the side skirt performs between the normal position and the displaced position, such that the normal position direction is equal to or parallel to the displaced position direction
1. or
the angle between the normal position direction and the displaced position direction is smaller than 30°.

In the embodiment, where the normal position direction is equal to the displaced position direction, the side skirt will have the same rotational position in the normal position and the displaced position and will only have been moved along the reference line.

In the embodiment, where the normal position direction is parallel to the displaced position direction, the side skirt will have the same rotational position in the normal position and the displaced position and will only have been moved translationally in a direction different to the reference line. In such an embodiment, the normal position direction and the displaced position direction can be in the same horizontal plane. This would mean that the side skirt moves sideways and backwards from the underframe, but stays in the same horizontal plane. Embodiments are, however, also feasible, where the side skirt should be lifted a little as it moves from the normal position to the displaced position. In such an embodiment, the normal position direction and the displaced position direction would be arranged in different horizontal planes.

In the embodiment, where the angle between the normal position direction and the displaced position direction is smaller than 90°, the side skirt will have a slightly changed rotational position in the displaced position when compared to the normal position. The side skirt will hence have been moved translationally and a little bit rotated. In a preferred embodiment, the angle between the normal position direction and the displaced position direction is smaller than 75°, preferably smaller than 60°, preferably smaller than 45°, preferably smaller than 30°, preferably smaller than 15°, preferably smaller than 5°.

In a preferred embodiment, the side skirt and the side skirt support will have intermediate positions between the normal position and the displaced position, in which the bar is arranged to point into direction that is between the first direction and the second direction. In a preferred embodiment, the rotation controller limits the amount of rotation that the side skirt performs between the normal position and any intermediate position, such that the angle between the normal position direction and the direction that the reference line takes up in the respective intermediate position is smaller than 30°, preferably smaller than 25°, preferably smaller than 20°, preferably smaller than 15°, preferably smaller than 5°.

In a preferred embodiment, the rotation controller limits the rotation that a part of the side skirt, that is attached to the bar, can perform relative to the bar, such that the part that is attached to the car can rotate into an end position, but cannot rotate beyond that end position.

In a preferred embodiment, the side skirt has a normal operating position and the side skirt support also has a normal operating position. In a preferred embodiment, the normal operating position is the position that the side skirt and the side skirt support will take up, when the coupler rod is in the neutral position and no sideways force has been exerted onto the side skirt and/or the side skirt support by an element that belongs to the coupler or is attached to the coupler (the coupler head or the coupler rod).

In a preferred embodiment, the bar and the part of the side skirt that is attached to the bar have a first relative position to each other in the normal position of the side skirt and the normal position of the side skirt support. In a preferred embodiment, the part of the side skirt that is attached to the bar, extends into a first direction, whereby the bar at least in that section of the bar that is attached to the side skirt extends along a second direction, whereby the first direction and the second direction are arranged at an angle to each other that will be defined as the normal position angle. In a preferred embodiment, in the normal position angle is between 10 and 90°, preferably between 30 and 60°.

In a preferred embodiment, the second joint is the most forward element, when the side skirt support is in the normal position, while the bar of the side skirt support extends backwards from the second joint. In a preferred embodiment, where the side skirt is provided with a back piece, the second joint also is the most forward part of the back piece, when the side skirt is in the normal position, while the remainder of the back piece progresses backward from the second joint. In such designs, where both the back piece and the bar extend backwards from the second joint, the normal position angle will preferably be below 90°, more preferably below 60° and can most preferably be around 30 to 45°.

In a preferred embodiment, the angle between the first direction and the second direction increases as the side skirt is moved out of the normal position. The rotation controller that is provided to limit the rotation that the part of the side skirt that is attached to the bar, can perform relative to the bar hence rules, how much of that part of the side skirt, that is attached to the bar, can rotate away from the bar as the side skirt and the side skirt support leave the normal position. If the rotation controller would not limit the rotation, the risk would exist, that a part of the side skirt over-rotates and takes up an undesired position, especially leads to a part of the side skirt sticky too far sideways or too far forward and coming into an area, where a collision with elements of the neighbouring car, for example parts of the side skirt of the neighbouring car could occur.

The rotation controller can be provided by simple means. For example, the part that is attached to the bar can have a protrusion with a hook, whereby the protrusion with the hook comes into contact with the bar as the part that is attached to the bar rotates into the end position. As the hook comes into contact with the bar, no rotation beyond this end position can take place.

In a preferred embodiment, the rotation controller is provided a further piece that is attached to the side skirt. Attaching a further piece to the side skirt provides two attachment points to the side skirt. The side skirt will be held at two points, namely the point where the second joint is attached to a part of the side skirt and at that point, where the further element is attached to the side skirt. Having two points of attachment to the side skirt allows for a better control of the movement of the side skirt in space. Especially in designs, where the side skirt has a back piece and a cover and the cover is made as a singular element, control over the relative position of the two attachment points in space translates into good control of the side skirt (the cover) in space. The attachment of the further element that acts as rotation controller to the side skirt allows to control the rotation of the part of the side skirt that is attached to the bar relative to the bar. By way of the rotation controller the movement of the attachment point of the rotation controller to the side skirt relative to the point, where the second joint is attached to the side skirt, can be used to limit the rotation of that part of the side skirt relative to the bar. In a preferred embodiment, the rotation controller can be a spring. The spring can be designed in such a manner that it pretensions the side skirt towards a preferred relative position to the bar. The spring can allow the part of the side skirt that is attached to the bar to rotate relative to the bar, for example if the part of the side skirt, that is attached to the bar, is rotated away from the bar as the side skirt leaves the normal position. However, this rotation will lead to the spring being expanded. Suitable choice of the strength of the spring allows to limit such a rotation of the part of the skirt, that is attached to the bar, relative to the bar to reaching an end position, after which the part of the side skirt cannot rotate further relative to the bar.

In a preferred embodiment, the rotation controller can be a hydraulic cylinder, whereby the cylinder head or the piston is attached to the side skirt and the other part, e.g. the piston or the cylinder head can be attached to the car. Suitable control of the expansion movement of the hydraulic cylinder can be used to control the rotation of the part of the side skirt that is attached to the bar relative to the bar.

In a preferred embodiment, the rotation controller is a further bar. The further bar can be attached to the side skirt, for example a back piece of the side skirt and can be attached to the underframe bar of the car. In a preferred embodiment, the further bar has a first joint, the first joint being suitable to be attached to the underframe to allow the further bar to rotate relative to the underframe, whereby the bar is attached to a further part of the side skirt, for example the same back piece, to which the (first) bar can be attached, too, by way of a second joint that allows the further part of the side skirt to rotate relative to the further bar.

In a preferred embodiment, the side skirt has a back piece, whereby the bar is connected to the back piece via the second joint, and whereby the rotation controller is provided by way of a further bar, a spring and/or a hydraulic cylinder, whereby the further bar, the spring and/or the hydraulic cylinder is attached to the back piece whereby the further bar, the spring and/or the hydraulic cylinder has a connection that is suitable to connect the further bar, the spring and/or the hydraulic cylinder to the underframe of the car. In a preferred embodiment, the connection of the further bar, the spring and/or the hydraulic cylinder to the underframe of the car allows the further bar, the spring and/or the hydraulic cylinder to rotate relative to the underframe of the car. In a preferred embodiment, the attachment of the further bar, the spring and/or the direct cylinder to the back piece allows the further bar, the spring and/or the direct cylinder to rotate relative to the back piece.

In a preferred embodiment the bar is a straight line bar. In a preferred embodiment, the first joint is provided at one end of the bar. In a preferred embodiment, the second joint is provided at a second end of the bar. Making the bar a straight line bar allows the bar to be manufactured easily. However, situations are conceivable, where certain elements are arranged below the underframe of the car and where the bar, if the bar were to be made as a straight bar, would collide with these elements. Hence situations are also feasible, where the bar is not a straight line bar, but is an angled bar or even a bend piece. An angled bar can, for example, have two straight line sub-sections that are connected to each other and that extend relative to each other at an angle.

In a preferred embodiment the further bar is a straight line bar. In a preferred embodiment, the first joint is provided at one end of the further bar. In a preferred embodiment, the second joint is provided at a second end of the further bar. Making the further bar a straight line bar allows the further bar to be manufactured easily. However, situations are conceivable, where certain elements are arranged below the underframe of the car and where the further bar, if the further bar were to be made as a straight bar, would collide with these elements. Hence situations are also feasible, where the further bar is not a straight line bar, but is an angled bar or even a bend piece. An angled bar can, for example, have two straight line sub-sections that are connected to each other and that extend relative to each other at an angle.

In a preferred embodiment the side skirt has a back piece and has a cover that is attached to the back piece. In a preferred embodiment, the back piece has a first attachment point, where the second joint is attached to the back piece, and has a second attachment point, where the rotation controller is attached to the back piece.

In a preferred embodiment, the side skirt support has a connector piece that is provided to connect the side skirt support to the underframe of the car, while in certain embodiments the connector piece can be considered to be part of the underframe of the car. The connector piece can have a first attachment point, where the first joint is attached to the connector piece. The connector piece can have a second attachment point, where the rotation controller is connected to the connection piece. Providing a connection piece that already includes the attachment of the first joint of the bar can simplify the process of attaching the side skirt support to the underframe of the car. With the connector piece, only the connector piece needs to be attached to the underframe of the car, for example by means of bolts.

In a preferred embodiment a distance keeping bar is provided that is attached to the bar of the side skirt support. In a preferred embodiment, the distance keeping bar extends at an angle to the bar. In an additional or alternative embodiment, a cam surface is arranged on the bar or on a piece that is attached to the bar.

In a preferred embodiment, a return spring is provided that is attached to the part of the side skirt, that is attached to the bar, and is attached to the bar, such that when the part of the side skirt, that is attached to the bar is in the end position, the return spring exerts a return force onto the part of the skirt, that is attached to the bar, that is directed to move the part of the side skirt, that is attached to the bar, at the end position and towards the normal position of the side skirt and the side skirt support.

The car according to the invention is a car of a multi-/car vehicle. The car according to the invention has an underframe and has a coupler that is suitable to couple the car to a neighbouring car of the multicar vehicle, the coupler being attached to the underframe, whereby the coupler has a coupler head and a coupler rod attached to the coupler head, the coupler rod being attached to the underframe by way of a coupler rod joint that allows the coupler to swivel relative to the underframe, whereby the coupler rod has a neutral position and can swivel towards one side of the neutral position and can swivel to the opposite side of the neutral position.

The car according to the invention further has a system according to the invention, whereby the bar of the side skirt support is attached to the underframe to allow the bar to rotate relative to the underframe while the first joint by when the coupler rod is in the neutral position the side skirt partially covers a space below the underframe from a side and/or the front, the coupler side edge of the side skirt being arranged next to the coupler head.

In a preferred embodiment, the coupler side edge is arranged next to the coupler head, but at a distance to the coupler head. The distance can be in the magnitude of several millimeters, preferably of several centimeters, for example in the range of 1 to 100 cm.

The distance between the coupler side edge and the coupler head can be used to determine idle distance about which the coupler head can move without touching the coupler side edge. A contact between the coupler head and the coupler side edge in combination with a continuous movement of the coupler head can be used as trigger to lift the side skirt. Hence any movement that the coupler head can perform prior to contacting the coupler side edge is a movement of the coupler head that occurs without lifting the side skirt in embodiments where a contact between the coupler head and the coupler side edge is used to lift the side skirt. The larger the distance about which the coupler head can move without touching the coupler side edge, the larger the swivel angle of the coupler that occurs without lifting the side skirt. Hence in embodiments where a contact between the coupler head and the coupler side edge is used to lift the side skirt, the distance between the coupler head and the coupler side edge in the normal operating position can be used to determine the free angle that the coupler head can swivel without lifting the side skirt.

In a preferred embodiment, the underframe has a corner, for example a front corner of the car, whereby the side skirt is designed in such a manner that it covers a space below the underframe from the side and from the front. The side skirt hence progresses around the corner of the car.

In a preferred embodiment of the coupler head has a coupling plate that defines a coupling plane. In a preferred embodiment, during a swivel movement of the coupler rod around the coupler rod joint from the neutral position to an end position, all parts of the side skirt remain on one side of the coupling plane. The end position of the coupler rod can either be provided by a rotation controller. Typically, in designs of couplers, the amount of the swivel angle, about which the coupler rod can swivel out of the neutral position, is set. In such a case, the end position of the coupler rod would be the maximum position that the coupler rod can be swiveled out of the neutral position.

In a preferred embodiment, a cam surface is arranged on the coupler rod or a cam surfaces is arranged on a piece that is attached to the coupler rod, whereby the side skirt support has a distance keeping bar attached to the bar of the side skirt support, the distance keeping bar extending at an angle to the bar and whereby an end of the distance keeping bar is arranged in contact with the cam surface or is arranged at a distance to the cam surface, but comes into contact with the cam surface as the coupler rod is swiveled out of the neutral position towards the side.

In an alternative embodiment, a distance keeping bar is attached to the coupler rod, the distance keeping bar extending at an angle to the coupler rod and whereby a cam surface is arranged on the bar or is arranged on a piece that is attached to the bar, whereby an end of the distance keeping bar is arranged in contact with the cam surface or is arranged distance from the cam surface, but can come into contact with the cam surface as the coupler rod is swiveled out of the neutral position towards one side.

The co-operation between the cam surface and the distance keeping part in the two alternative embodiments can be used coordinate the position of the side skirt relative to other elements of the car as the side skirt is moved. For example the shape of the cam surface can be chosen such that during the movement of the side skirt the distance between the coupler head and the coupler side edge remains the same.

In a preferred embodiment, the end of the distance keeping bar has a roller that facilitates the movement of the end of the distance keeping bar relative to the cam surface, because the roller can roll along the cam surface.

Designs are feasible, where a separate drive drives parts of the side skirt, for example a rotational drive that drives the bar to rotate about the first joint. This will cause additional complexity and energy consumption, however. Hence in a preferred embodiment no additional drive is provided, especially no additional drive is provided that drive the bar to rotate about the first joint. The movement of the side skirt preferably is solely caused by the movement of the coupler; either by way of the coupler head contacting the coupler side edge or by way of a cam interacting with a distance keeping bar.

In a preferred embodiment, a return spring that is attached to the part of the side skirt, that is attached to the bar, and that is attached to the car, is provided, such that when the part of the side skirt, that is attached to the bar, is in the end position, the return spring exerts a return force onto the part of the side skirt, that is attached to the bar, that is directed to move the part of the side skirt, that is attached to the bar, out of the end position. The return spring can be a spiral spring with one end of the spring attached to the side skirt or the side skirt support and the other end attached to the underframe of the car. The return spring can also be a torsion spring, possibly a torsion spring arranged between the side skirt and the side skirt support or a torsion spring arranged between the side skirt support and the underframe of the car. The return spring can also be a hydraulic cylinder or damper or gas spring.

In a preferred embodiment, a guide rail is provided on the car and a roller is provided on the side skirt, whereby the roller travels along the guide rail as the bar rotates about the first joint. If the side skirt is made to be a large piece, it can be preferred, if the side skirt can be designed to rest against parts of the car. Such a point of contact can be provided by way of a guide rail and a roller.

In a preferred embodiment, a guide rail in the sense of a coulisse is provided on the car and a pin is provided on the side skirt, whereby the pin travels within the guide rail as the bar rotates about the first joint. If the side skirt is made to be a large piece, the pin guided in the guide rail can be used to determine the movement of the side skirt in space.

In a preferred embodiment,
a. a first system according to the invention is provided, providing a first side skirt and a first side skirt support, whereby the bar of the first side skirt support is attached to the underframe to allow the bar to rotate relative to the underframe via the first joint and whereby when the coupler rod is in the neutral position the first side skirt partially covers a space below the underframe from a first side, the coupler side edge of the first side skirt being arranged next to the coupler head on a first side
   i. and
b. a second system according to the invention is provided, providing a second side skirt and a second side skirt support, whereby the bar of the second side skirt support is attached to the underframe to allow the bar to rotate relative to the underframe via the first joint and whereby when the coupler rod is in the neutral position the second side skirt partially covers a space below the underframe from a second side, the coupler side edge of the second side skirt being arranged next to the coupler head on a second side.

In the method according to the invention to move a side skirt in a car according to the invention the side skirt is in its normal operating position, when the coupler rod is in the neutral position and it is provided that a. the coupler head contacts the coupler side edge as the coupler rod swivels out of the neutral position towards one side around the coupler rod joint and moves the side skirt out of its normal operating position towards the side as the coupler rod continues to swivel around the coupler rod joint, whereby the force applied by the coupler head to the side skirts makes the bar of the side skirt support swivel about the first joint
   i. or
b. a cam surface is arranged on the coupler rod or a piece that is attached to the coupler rod, whereby the side skirt support has a distance keeping bar attached to the bar of the side skirt support, the distance keeping bar extending at an angle to the bar and an end of the distance keeping bar being arranged in contact with the cam surface, whereby when the coupler rod swivels about the coupler rod joint towards one side, the cam surface exerts a force onto the distance keeping bar that makes the bar of the side skirt support swivel about the first joint.

BRIEF DESCRIPTION OF DRAWINGS

Below the invention will be described with reference to figures that only show embodiments of the invention and the prior art. In the figures it is shown

DETAILED DESCRIPTION

Figure 1:
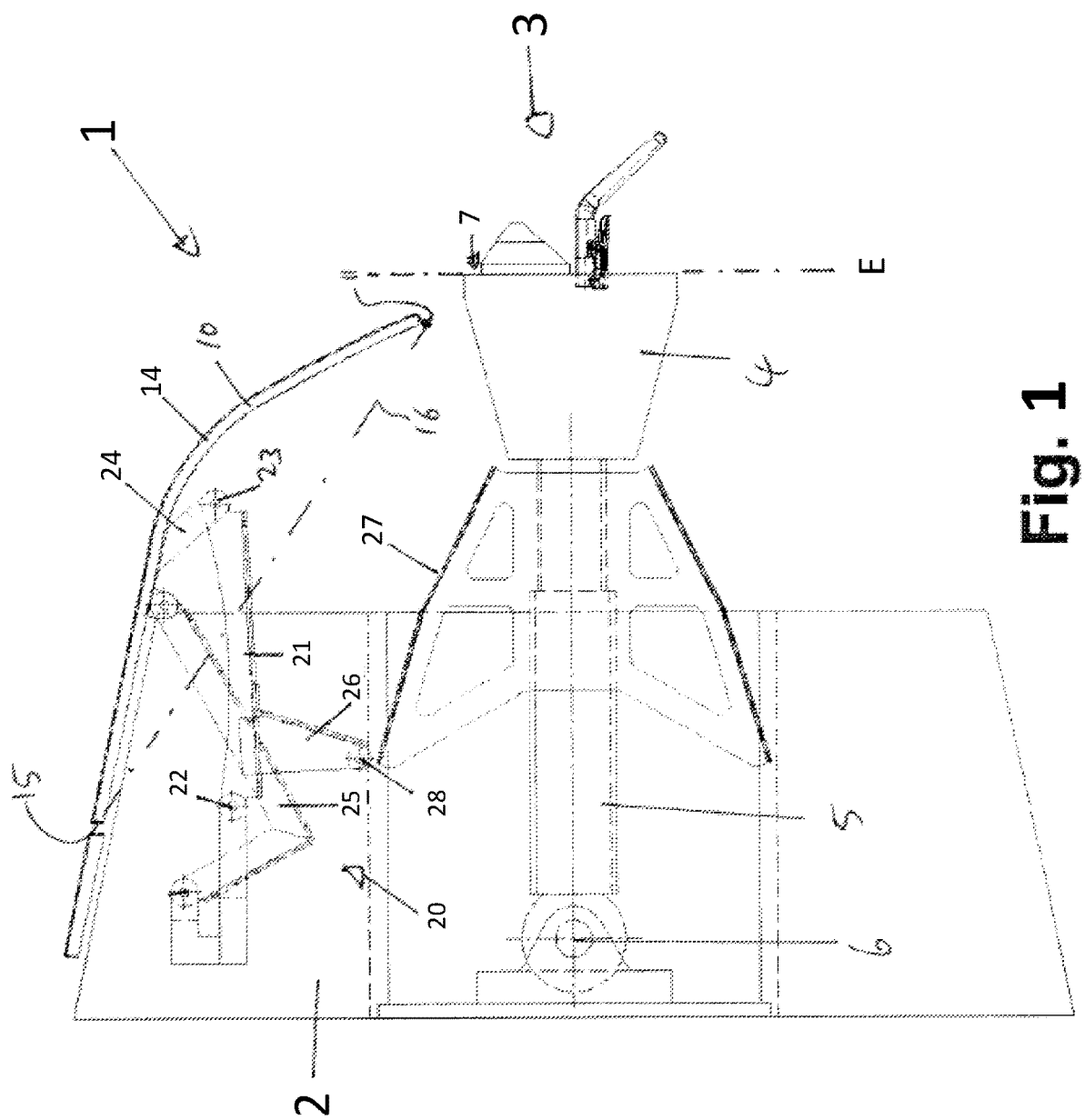
FIG. 1 is a schematic view onto a car of a multi-car vehicle with a system of a side skirt and a side skirt support according to a first embodiment of the invention from below in a first operating condition.
Figure 2:
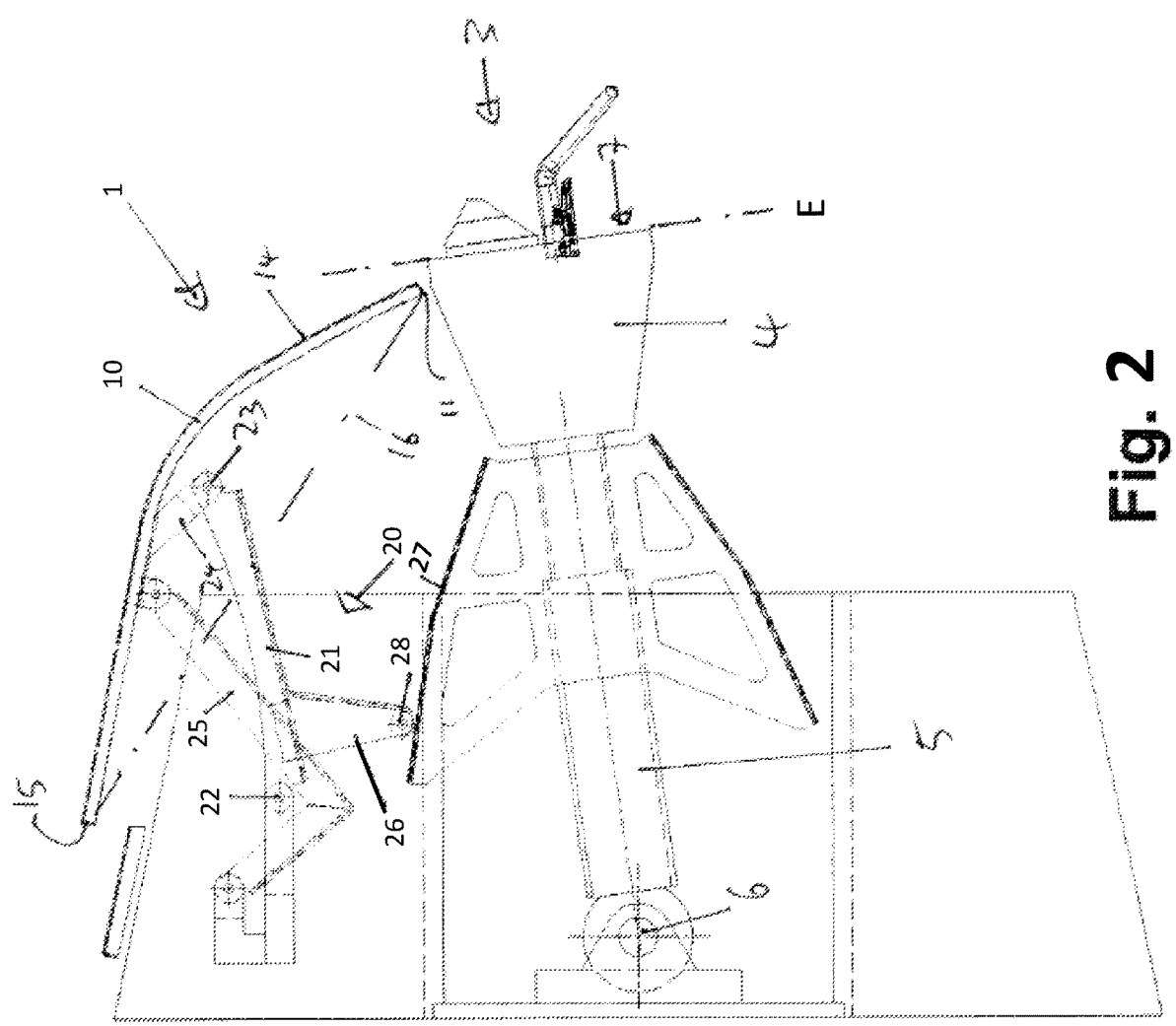
FIG. 2 is a view onto the car as of FIG. 1 but with the system in a second operating condition.

FIGS. 1 to 7 each show part of a car, namely the front part of a car 1 of a multi-car vehicle. The car 1 has an underframe 2 and a coupler 3 that is suitable to couple the car 1 to a neighboring car of the multi-car vehicle. The coupler 3 is attached to the underframe 2. The coupler 3 has a coupler head 4. The coupler 3 also has a coupler rod 5 that is attached to the coupler head 4, the coupler rod 5 being attached to the underframe 2 by way of a coupler rod joined 6. The coupler rod joined 6 allows the coupler rod 5 to swivel relative to the underframe 2. The coupler rod has a neutral position shown in FIGS. 1, 4, 7 and 11 respectively. The coupler rod 5 can swivel towards one side of the neutral position and cancellable the opposite of the neutral position.

Figure 4:
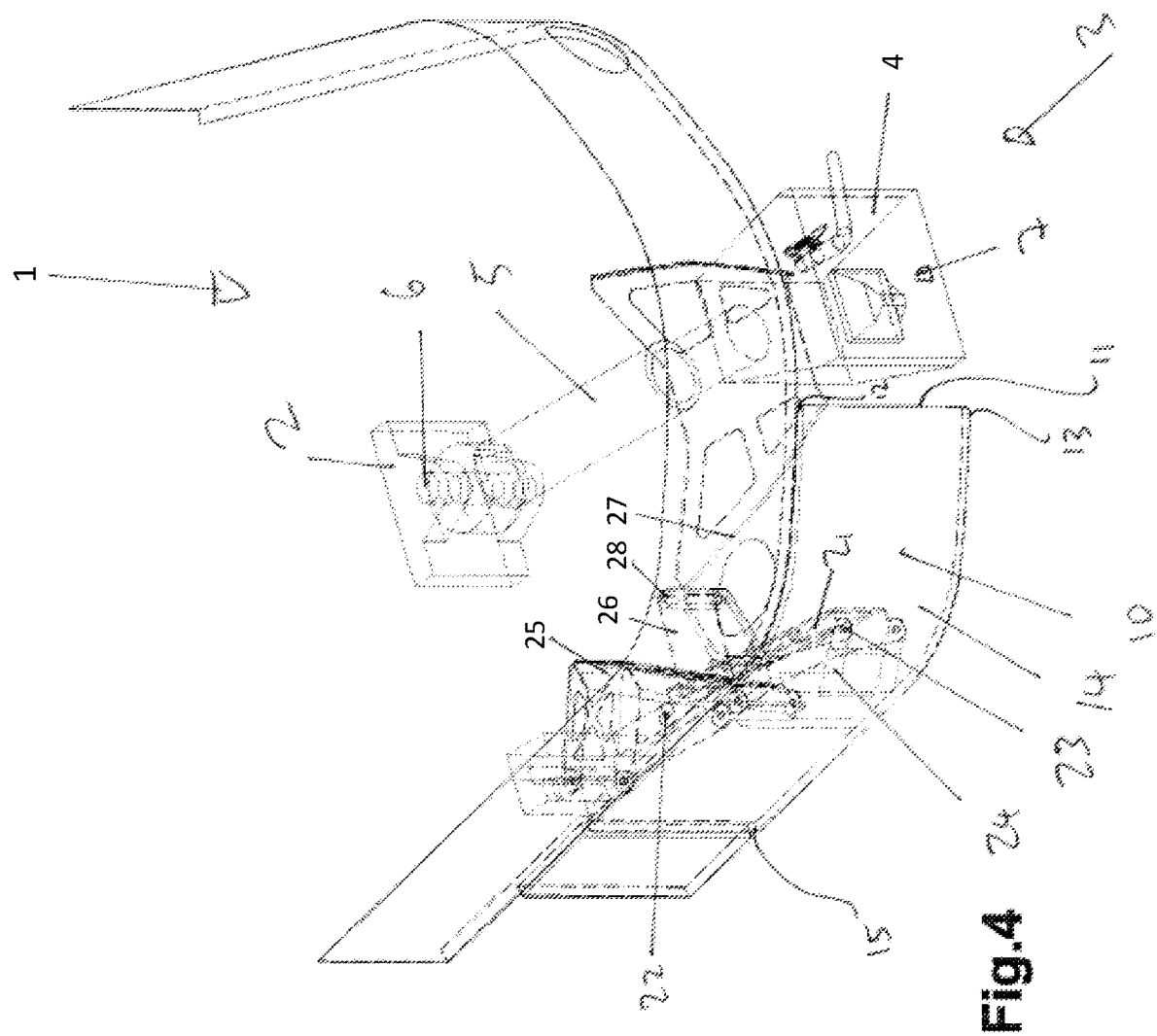
FIG. 4 is a schematic view onto a car of a multi-car vehicle with a system of a side skirt and a side skirt support according to a second embodiment of the invention from below in a first operating condition.
Figure 5:
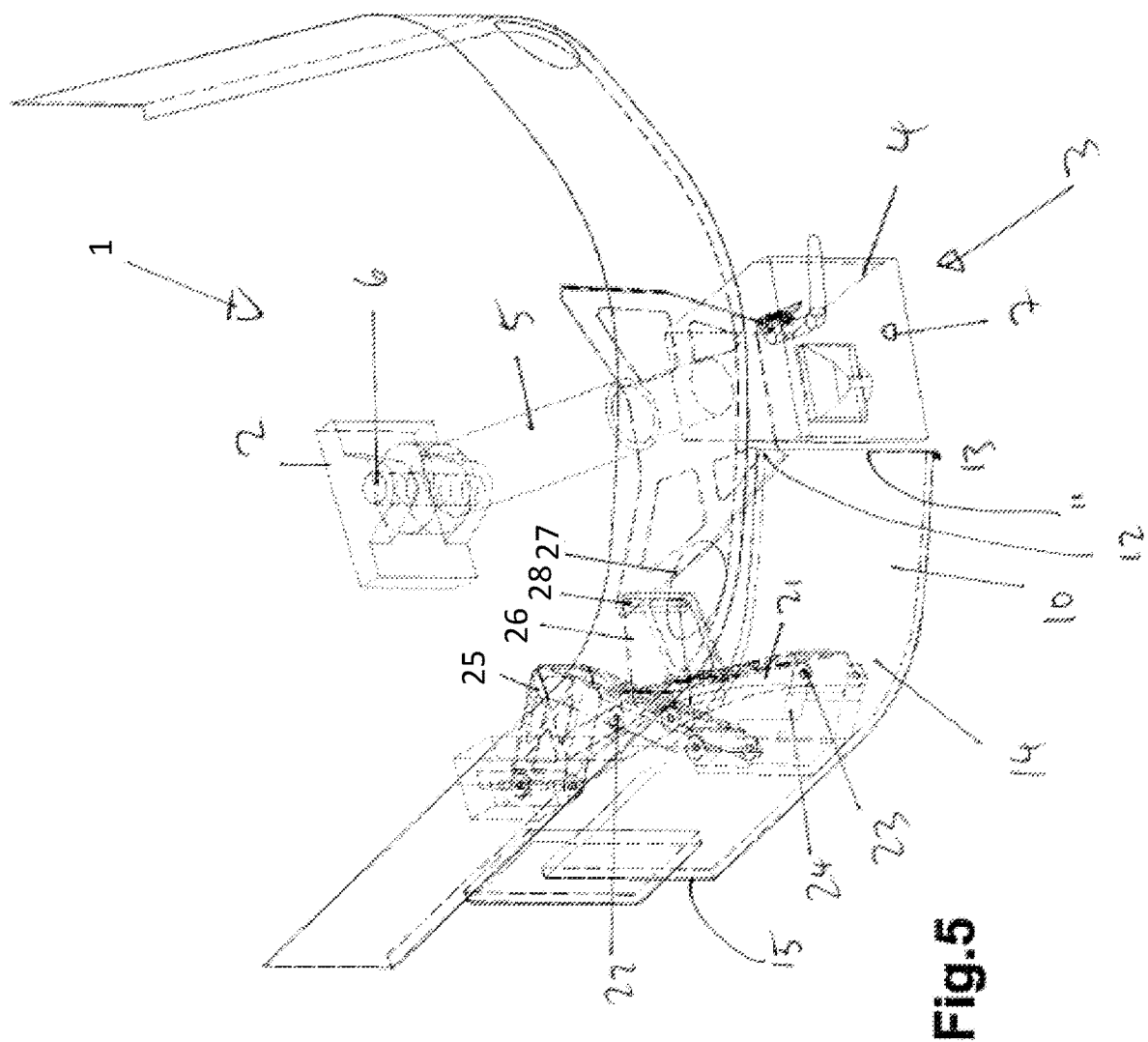
FIG. 5 is a view onto the car as of FIG. 4 but with the system in a second operating condition.
Figure 6:
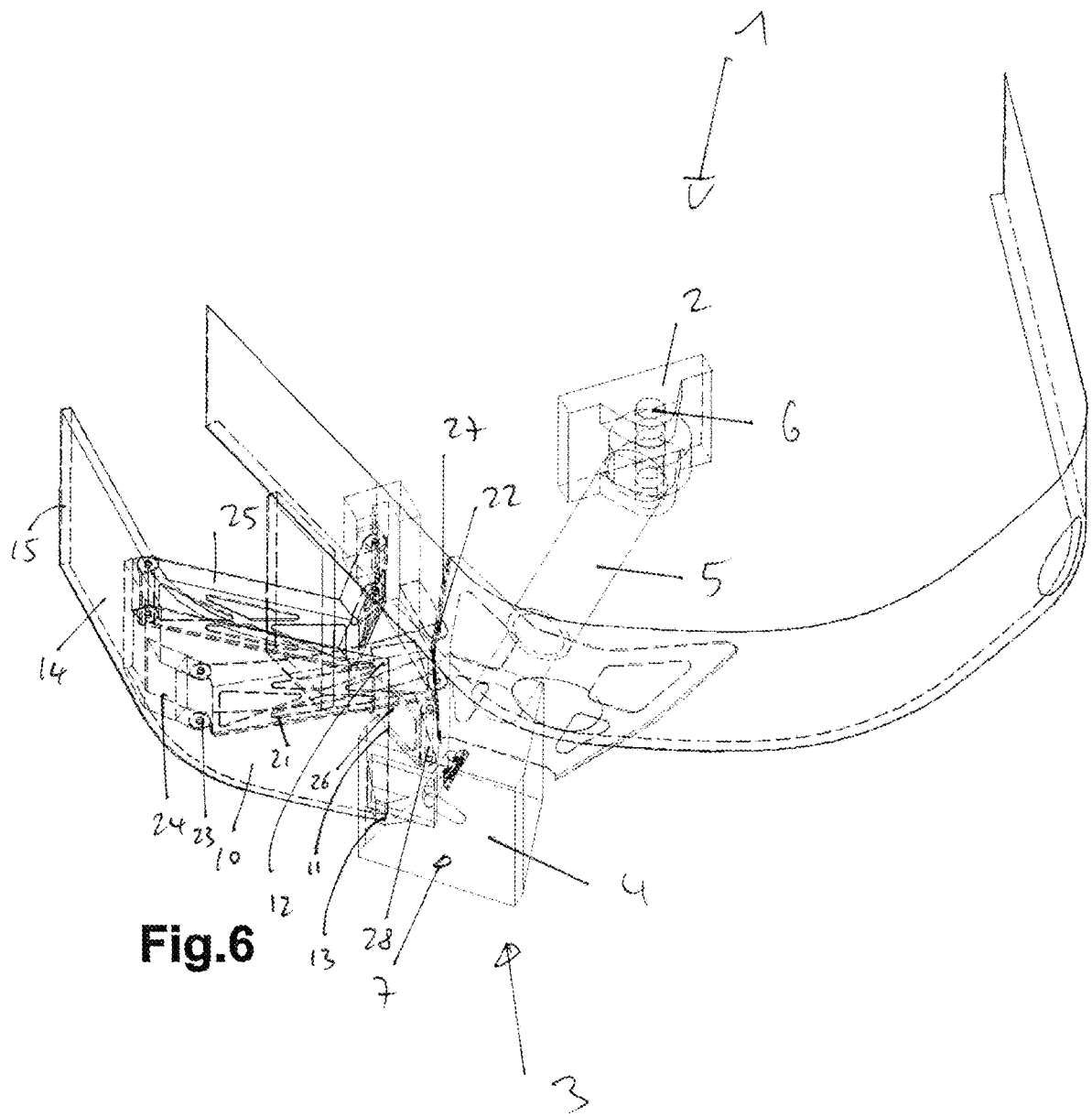
FIG. 6 is a view onto the car as of FIG. 4 but with the system in a third operating condition and FIG. 7 is a layover of FIG. 1 and FIG. 3.

The car 1 shown in the Figures has a system of a side skirt 10 and a side skirt support 20. The side skirt 10 is suitable to cover a space below the underframe 2 of the car 1 from a side as best shown in FIG. 4. The side skirt has a coupler side edge 11 that forms a side of the side skirt 10. As best shown in FIGS. 4 to 6, the coupler side edge 12 can be the edge of the side skirt 10 that runs from a top corner 12 to a bottom corner 13 of the side skirt 10. Other designs of the coupler side edge 11 are, however, also feasible. Designs can, for example, be thought of, where the side skirt has a top part extension and instead of having the top corner 12 extends further sideways and even into the space above the coupler head 4. Generally, the coupler side edge 11 is suitable to be arranged next to a coupler head 4 of the car.

The side skirt 10 also has a rear side 15, whereby a reference line 16 is defined to be a line that connects a point on the coupler side edge 11 with a point on the rear side 16.

The side skirt support 20 is suitable to attach the side skirt 10 to the underframe 2 of the car 1. The side skirt support 20 has a bar 21 that has a first joint 22. The first joint 22 is suitable to be attached to the underframe 2 to allow the bar 21 to rotate relative to the underframe 2, whereby the bar 21 is attached to a part of the side skirt 10 by way of a second joint 23 that allows the part of the side skirt 10 to rotate relative to the bar 21.

The side skirt 10 and the side skirt support 20 have a normal position (shown in FIG. 1 and FIG. 4 respectively), in which the bar 21 is arranged to point into a first direction. The side skirt 10 and the side skirt support 20 have a displaced position (shown in FIG. 3 and in FIG. 6 respectively), in which the bar 21 is arranged to point into a second direction. The reference line 16 is pointing into a normal position direction, when the side skirt 10 and the side skirt support 20 are in the normal position (shown in FIG. 1 and FIG. 4 respectively), and the reference line 16 is pointing into a displaced position direction, when the side skirt 10 and the side skirt support 20 are in the displaced position (shown in FIG. 3 and in FIG. 6). In the embodiments shown, the angle between the normal position direction (reference line in FIG. 1 and FIG. 4) and the displaced position direction (reference line in FIG. 3 and in FIG. 6 respectively) is smaller than 30°.

Figure 3:
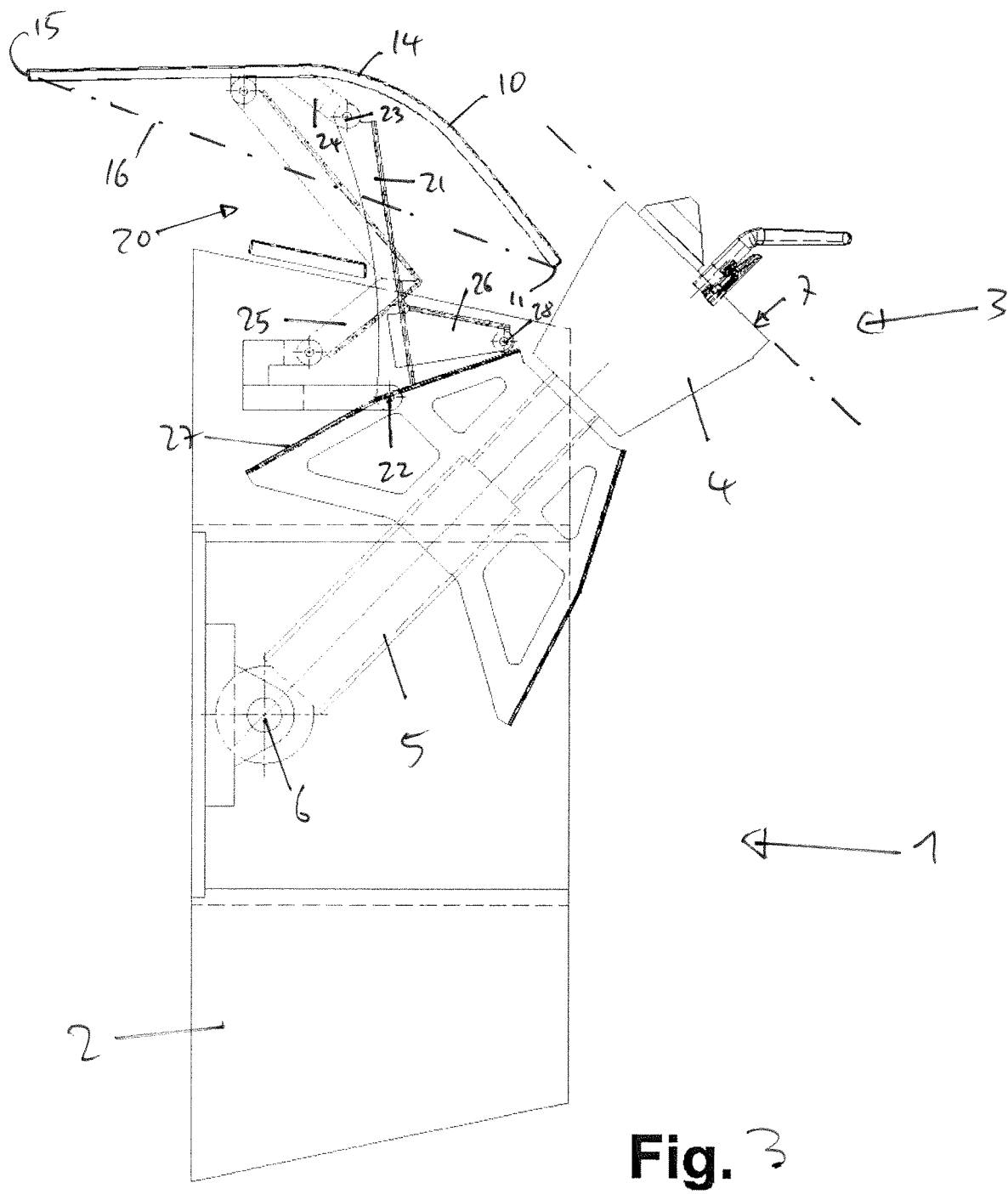
FIG. 3 is a view onto the car as of FIG. 1 but with the system in a third operating condition.
Figure 7:
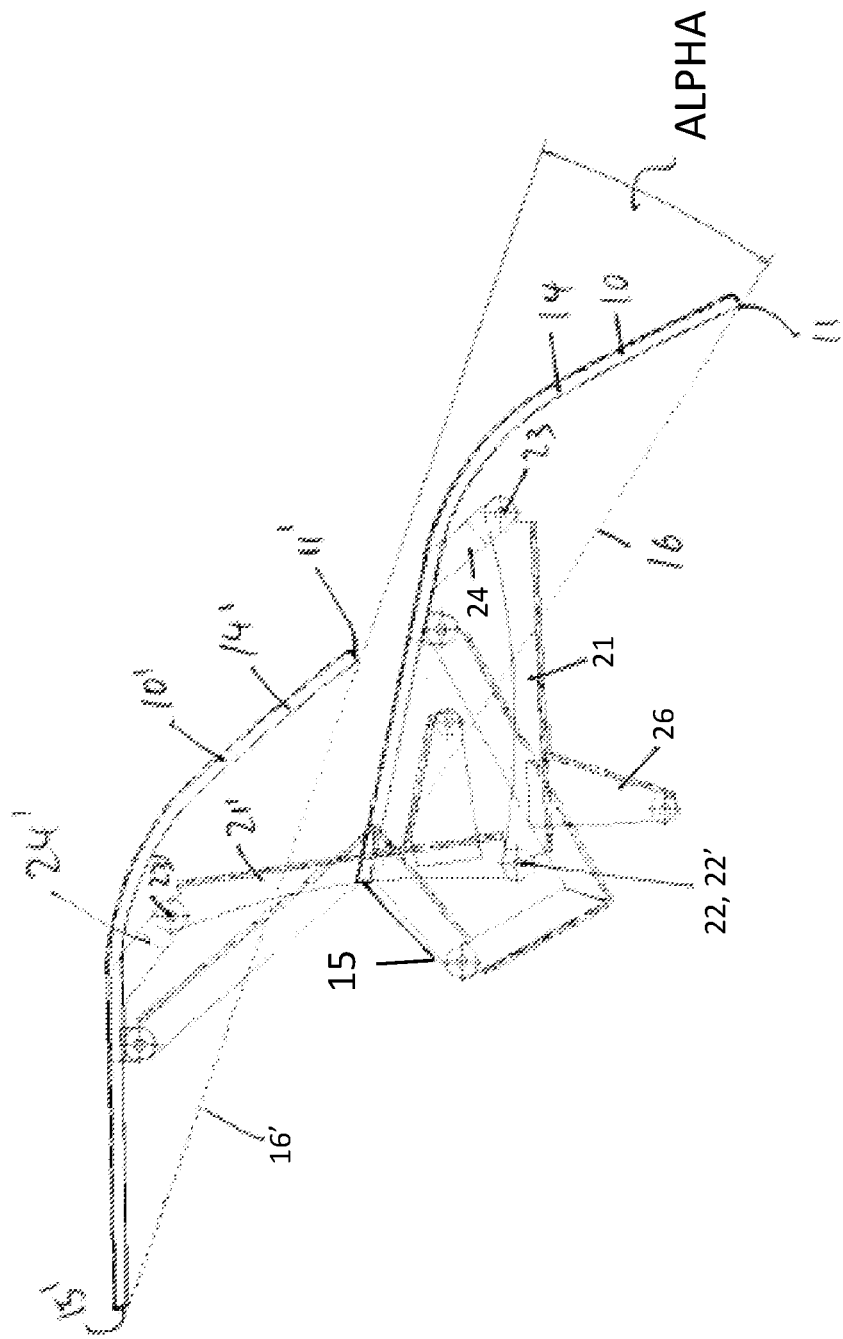

FIG. 7 shows a layover of FIG. 1 and FIG. 3 that shows the respective position of the references line in the normal position and the displaced position and shows that in this embodiment the angle ALPHA between the normal position direction and the displaced position direction is approximately 15°. In FIG. 7 those elements that are in their normal position are shown with normal reference signs; those elements that are in their displaces position have reference signs with a ' added to them (10',11',14',15',16', 21',22',23', 24')

The side skirt 10 has a back piece 24, whereby the bar 21 is connected to the back piece 24 via the second joint 23. The side skirt support 20 has a further bar 25 that acts as rotation controller. The further bar 25 is attached to the back piece 24. The further bar 25 furthermore is connected to the underframe 2 of the car 1. As can be seen when following the motion that the side skirt 10 and the side skirt support 20 taken in the different operating position (compare the succession of FIGS. 1, 2, 3), the further bar 25 influences the relative position that the back piece 24 (and hence the part of the side skirt 10 that is attached to the bar 21) can take relative to the bar 21. The further bar 25 hence operates as rotation controller that limits the rotation that the part of the side skirt 10 (namely the back piece 24), that is attached to the bar 21, can perform relative to the bar 21, such that the part (the back piece 24) that is attached to the bar 21 can rotate into an end position (see FIG. 3, 6), but cannot rotate beyond that end position.

The FIGS. 1 to 7 show, that the system according to the invention has a side skirt 10 that has a cover part 14 that is attached to the back piece 24. The cover part 14 is a one-piece part.

In the embodiments shown in FIGS. 4 to 10, a distance keeping bar 26 is attached to the bar 21 of the side skirt support 20. The distance keeping bar 26 extends at an angle to the bar 21. In the embodiments shown in FIGS. 1 to 7, the coupler head 4 of the car 1 according to the invention has a coupling plate 7 that defines a coupling plane E, whereby during a swivel movement of the coupler rod 5 around the coupler rod joint 6 from the neutral position (see FIG. 1, 4) to an end position (see FIG. 3, FIG. 6) all parts of the side skirt 10 remain on one side of the coupling plane E.

A cam surface 27 is arranged on the coupler rod, whereby the distance keeping bar 26 attached to the bar 21 of the side skirt support 20 has an end 28 that is arranged in contact with the cam surface 27.

The method according to the invention to move a side skirt 10 starts in the neutral position shown in the FIGS. 1, 3. In the embodiments shown, when the coupler rod 5 swivels about the coupler rod joint 6 towards one side, the cam surface 27 exerts a force onto the distance keeping bar 26 that makes the bar 21 of the side skirt support 20 swivel about the first joint 22. Given the arrangement and design of the system according to the invention, the side skirt moves outwards and backwards, but in a way that all parts of the side skirt remain on one side of the coupling plane E.

The invention claimed is:

1. System of a side skirt for a car of a multi-car vehicle and a side skirt support, the side skirt being suitable to cover a space below the underframe of the car from a side, the side skirt having a coupler side edge that forms a side of the side skirt, the coupler side edge configured to be arranged next to a coupler head of the car, the side skirt having a rear side and wherein a reference line is defined to be a line that connects a point on the coupler side edge with a point on the rear side, wherein
    the side skirt support is suitable to attach the side skirt to the underframe of the car,
    the side skirt support has a bar that has a first joint, the first joint configured to be attached to the underframe to allow the bar to rotate relative to the underframe, wherein the bar is attached to a part of the side skirt by way of a second joint that allows the part of the side skirt to rotate relative to the bar,
wherein the side skirt and the side skirt support have a normal position, in which the bar is arranged to point into a first direction, and wherein the side skirt and the side skirt support have a displaced position, in which the bar is arranged to point into a second direction,
wherein the reference line (YY) is pointing into a normal position direction, when the side skirt and the side skirt support are in the normal position, and the reference line (YY) is pointing into a displaced position direction, when the side skirt and the side skirt support are in the displaced position,
wherein a rotation controller limits the amount of rotation that the side skirt performs between the normal position and the displaced position, such that
    the normal position direction is equal to or parallel to the displaced position direction or
    the angle between the normal position direction and the displaced position direction is smaller than 30°.

2. System according to claim 1, wherein the side skirt has a back piece, wherein the bar is connected to the back piece via the second joint, and wherein the rotation controller is provided by way of a further bar, a spring and/or a hydraulic cylinder, wherein the further bar, the spring and/or the hydraulic cylinder is attached to the back piece and wherein the further bar, the spring and/or the hydraulic cylinder has a connection that is suitable to connect the further bar, the spring and/or the hydraulic cylinder to the underframe of the car.

3. System according to claim 2, wherein the side skirt has a cover part that is attached to the back piece.

4. System according to claim 1, further comprising a distance keeping bar attached to the bar of the side skirt support, the distance keeping bar extending at an angle to the bar.

5. System according to claim 1, further comprising a return spring that is attached to the part of the side skirt that is attached to the bar, and is attached to the bar, such that when the part of the side skirt that is attached to the bar is in an end position, the return spring excerpts exerts a return force onto the part of the side skirt that is attached to the bar that is directed to move the part of the side skirt that is attached to the bar out of the end position.

6. Car of a multi-car vehicle, the car having an underframe and a coupler that is suitable to couple the car to a neighboring car of the multi-car vehicle, the coupler being attached to the underframe, wherein:
    the coupler has a coupler head and a coupler rod attached to the coupler head, the coupler rod being attached to the underframe by way of a coupler rod joint that allows the coupler rod to swivel relative to the underframe, wherein the coupler rod has a neutral position and can swivel towards one side of the neutral position and can swivel to the opposite side of the neutral position,
    the car further having a system of a side skirt and a side skirt support, the side skirt being suitable to cover a space below the underframe of the car from a side, the side skirt having a coupler side edge that forms a side of the side skirt, the coupler side edge being suitable to be arranged next to a coupler head of the car, the side skirt also having a rear side, wherein a reference line is defined to be a line that connects a point on the coupler side edge with a point on the rear side, wherein
    the side skirt support is configured to attach the side skirt to the underframe of the car,
    the side skirt support has a bar that has a first joint, the first joint being suitable to be attached to the underframe to allow the bar to rotate relative to the underframe, wherein the bar is attached to a part of the side skirt by way of a second joint that allows the part of the side skirt to rotate relative to the bar,
wherein the side skirt and the side skirt support have a normal position, in which the bar is arranged to point into a first direction, and wherein the side skirt and the side skirt support have a displaced position, in which the bar is arranged to point into a second direction, wherein the reference line (YY) is pointing into a normal position direction, when the side skirt and the side skirt support are in the normal position, and the reference line (YY) is pointing into a displaced position direction, when the side skirt and the side skirt support are in the displaced position, wherein a rotation controller limits the amount of rotation that the side skirt performs between the normal position and the displaced position, such that: the normal position direction is equal to or parallel to the displaced position direction, or the angle between the normal position direction and the displaced position direction is smaller than 30°, and wherein the bar of the side skirt support is attached to the underframe to allow the bar to rotate relative to the underframe via the first joint; and when the coupler rod is in the neutral position, the side skirt partially covers a space below the underframe from a side, the coupler side edge of the side skirt being arranged next to the coupler head.

7. Car according to claim 6, wherein the coupler head has a coupling plate that defines a coupling plane (E), wherein during a swivel movement of the coupler rod around the coupler rod joint from the neutral position to an end position, all parts of the side skirt remain on one side of the coupling plane (E).

8. Car according to claim 6, further comprising a cam surface arranged on the coupler rod or a piece that is attached to the coupler rod, wherein the side skirt support has a distance keeping bar attached to the bar of the side skirt support, the distance keeping bar extending at an angle to the bar and an end of the distance keeping bar being arranged in contact with the cam surface.

9. Car according to claim 6, further comprising a return spring that is attached to the part of the side skirt that is attached to the bar, and is attached to the car, such that when the part of the side skirt that is attached to the bar is in an end position, the return spring excerpts exerts a return force onto the part of the side skirt that is attached to the bar that is directed to move the part of the side skirt that is attached to the bar out of the end position.

10. Car according to claim 6, further comprising a guide rail provided on the car and a roller provided on the side skirt, whereby the roller travels along the guide rail as the bar rotates about the first joint.

11. Car according to claim 6, further comprising
   a. a first said system providing a first side skirt and a first side skirt support, wherein the bar of the first side skirt support is attached to the underframe to allow the bar to rotate relative to the underframe via the first joint and wherein when the coupler rod is in the neutral position the first side skirt partially covers a space below the underframe from a first side, the coupler side edge of the first side skirt being arranged next to the coupler head on a first side;

and b. a second said system providing a second side skirt and a second side skirt support, wherein the bar of the second side skirt support is attached to the underframe to allow the bar to rotate relative to the underframe via the first joint and wherein when the coupler rod is in the neutral position the second side skirt partially covers a space below the underframe from a second side, the coupler side edge of the second side skirt being arranged next to the coupler head on a second side.

12. Method to move a side skirt in a car according to claim 6, wherein the side skirt is in its normal position when the coupler rod is in the neutral position and wherein a. the coupler head contacts the coupler side edge as the coupler rod swivels out of the neutral position towards one side around the coupler rod joint and moves the side skirt out of its normal position towards the side as the coupler rod continues to swivel around the coupler rod joint, wherein the force applied by the coupler head to the side skirts makes the bar of the side skirt support swivel about the first joint, or b. a cam surface is arranged on the coupler rod or a piece that is attached to the coupler rod, wherein the side skirt support has a distance keeping bar attached to the bar of the side skirt support, the distance keeping bar extending at an angle to the bar, and an end of the distance keeping bar being arranged in contact with the cam surface, wherein when the coupler rod swivels about the coupler rod joint towards one side, the cam surface exerts a force onto the distance keeping bar that makes the bar of the side skirt support swivel about the first joint.

\* \* \* \* \*